US012648542B2

(12) United States Patent
Mostert

(10) Patent No.: US 12,648,542 B2
(45) Date of Patent: Jun. 9, 2026

(54) MILKING DEVICE, MILK FILTER AND FILTER CARTRIDGE

(71) Applicant: LELY PATENT N.V., Maassluis (NL)

(72) Inventor: Gerard Mostert, Schipluiden (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 18/716,238

(22) PCT Filed: Dec. 15, 2022

(86) PCT No.: PCT/IB2022/062304
§ 371 (c)(1),
(2) Date: Jun. 4, 2024

(87) PCT Pub. No.: WO2023/119083
PCT Pub. Date: Jun. 29, 2023

(65) Prior Publication Data
US 2025/0031659 A1    Jan. 30, 2025

(30) Foreign Application Priority Data
Dec. 20, 2021    (NL) ...................................... 2030195

(51) Int. Cl.
*A01J 11/06*        (2006.01)
*A01J 7/02*         (2006.01)
(Continued)

(52) U.S. Cl.
CPC .............. *A01J 11/06* (2013.01); *A01J 7/027* (2013.01); *B01D 29/33* (2013.01); *B01D 29/35* (2013.01); *A01J 7/022* (2013.01)

(58) Field of Classification Search
CPC .... A01J 7/02; A01J 7/022; A01J 7/027; A01J 11/06; A47J 19/005; A47J 43/24; B01D 29/33; B01D 29/35
See application file for complete search history.

(56) References Cited

U.S. PATENT DOCUMENTS

| 2,193,508 A | * | 3/1940 | Cordts | ...................... | A01J 11/06 |
| | | | | | 141/335 |
| 2,357,500 A | * | 9/1944 | Cann | ........................ | A01J 11/06 |
| | | | | | 210/305 |

(Continued)

FOREIGN PATENT DOCUMENTS

| KR | 20130052317 A | * | 5/2013 | ................ | A01J 9/02 |
| NO | 330181 B1 | | 2/2011 | | |

(Continued)

OTHER PUBLICATIONS

International Search Report mailed on May 25, 2023 in PCT/IB2022/062304 filed on Dec. 15, 2022 (3 pages).

*Primary Examiner* — Michael H Wang
(74) *Attorney, Agent, or Firm* — Oblon, McClelland, Maier & Neustadt, L.L.P.

(57)                ABSTRACT

A milking device has milking means, a controller, a milk line for transporting the milk from the milking means to a milk tank, a milk filter for filtering the milk passing through the milk line, and a cleaning device for cleaning the milk filter with cleaning fluid. The milk filter comprises a housing which surrounds a filter volume and has a milk inlet and a milk outlet, and a circumferential filter body. The filter body comprises filter holes and divides the filter volume into an inner filter volume and an outer filter volume. The milk filter is configured to be flushed during use. The cleaning device is configured to clean the milk filter. The filter holes are grouped into a first group and a second group. The diameter of the holes in the first group is greater than that of the second group.

18 Claims, 2 Drawing Sheets

Figure 1:
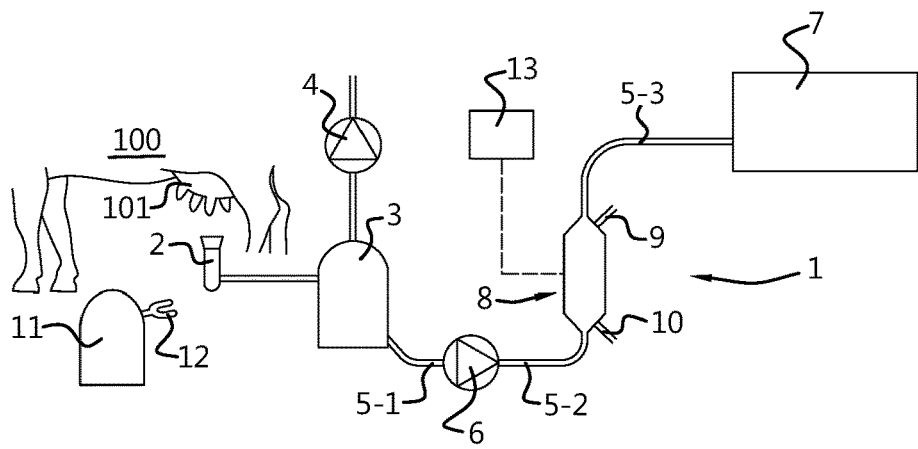

(51) Int. Cl.
  *B01D 29/33*      (2006.01)
  *B01D 29/35*      (2006.01)

(56)            References Cited

U.S. PATENT DOCUMENTS

|  |  |  |  |  |
|---|---|---|---|---|
| 2,779,478 | A * | 1/1957 | Wahlin | B21B 45/08 |
|  |  |  |  | 210/462 |
| 3,481,474 | A * | 12/1969 | Paulson | B01D 29/115 |
|  |  |  |  | 210/497.1 |
| 3,614,863 | A * | 10/1971 | Patterson | F22B 37/327 |
|  |  |  |  | 55/455 |
| 10,214,931 | B2 * | 2/2019 | Saccoccio | B01D 29/31 |
| 11,382,448 | B1 * | 7/2022 | Crane | B01D 24/44 |
| 2004/0123807 | A1 * | 7/2004 | Bosma | A01J 11/06 |
|  |  |  |  | 119/14.18 |
| 2010/0310711 | A1 * | 12/2010 | Kendell | A23B 11/14 |
|  |  |  |  | 210/411 |
| 2016/0185474 | A1 * | 6/2016 | Bronner | A23L 2/74 |
|  |  |  |  | 53/111 R |
| 2017/0204746 | A1 * | 7/2017 | Ryon | F02C 7/222 |

FOREIGN PATENT DOCUMENTS

| | | | | |
|---|---|---|---|---|
| RU | 175 706 | U1 | 12/2017 | |
| WO | WO-2024199525 | A1 * | 10/2024 | A23B 11/14 |

* cited by examiner

Fig. 3A
Fig. 3B
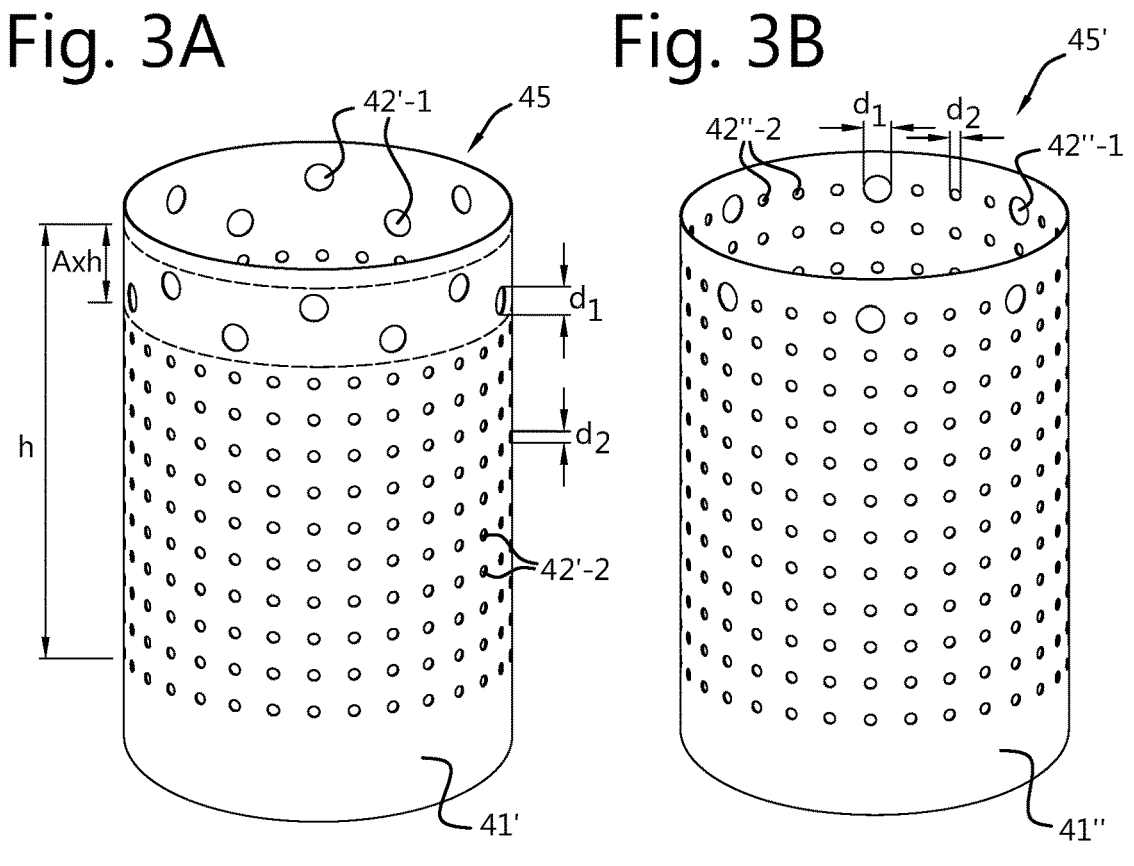
Fig. 4
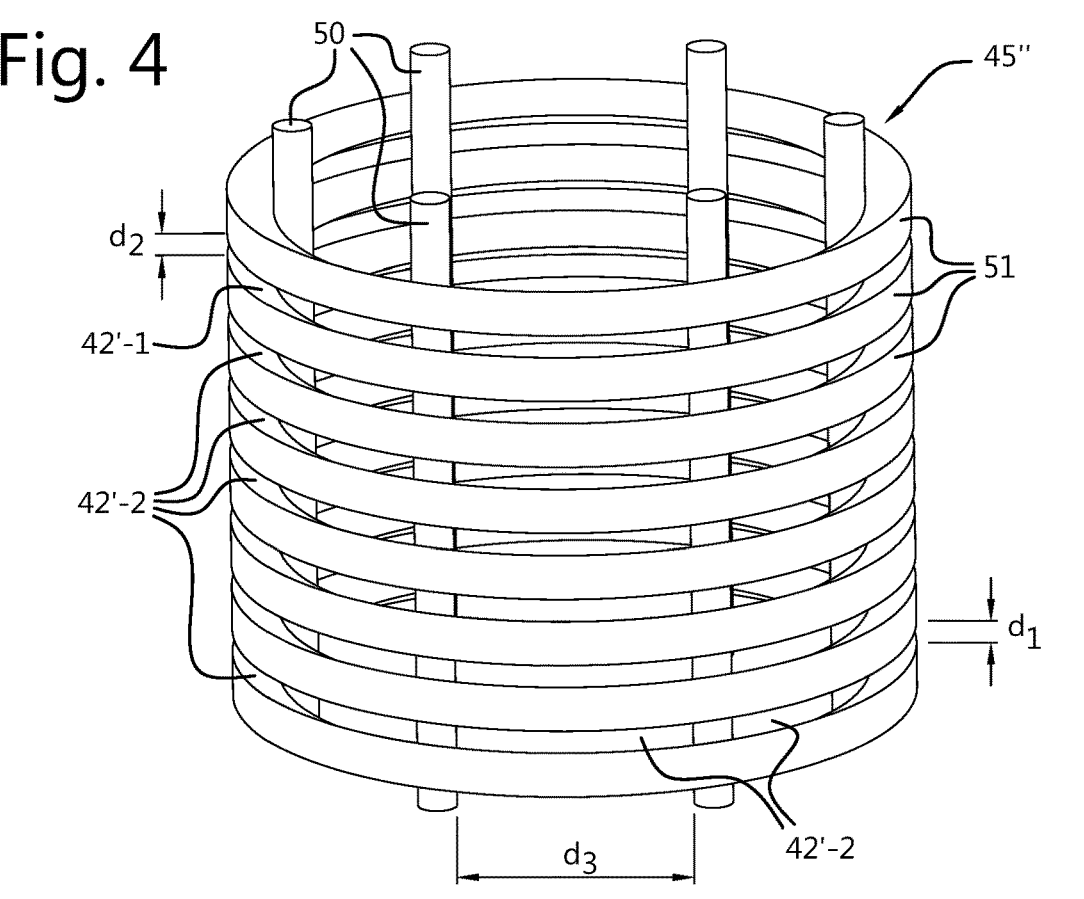

MILKING DEVICE, MILK FILTER AND FILTER CARTRIDGE

CROSS REFERENCE TO RELATED APPLICATIONS

This application is a National Stage entry under 35 U.S.C. § 371 of PCT/IB2022/062304, filed on Dec. 15, 2022, and claims priority to NL Patent Application No. 2030195, filed Dec. 20, 2021, the entire contents of which are incorporated herein by reference.

The invention concerns a milking device for milking a dairy animal, and provided with milking means, a controller for the milking device, a milk line for transporting the milk from the milking means to a milk tank, a milk filter for filtering the milk passing through the milk line, and a cleaning device for cleaning the milk filter with cleaning fluid, wherein the milk filter comprises a housing surrounding a filter volume and comprising a milk inlet part with a milk inlet, a milk outlet part with a milk outlet, and a circumferential outer wall in between, a filter body provided in the filter volume and comprising a circumferential filter body with plurality of filter holes, which divides the filter volume into a central inner filter volume connected to one of the milk inlet and the milk outlet, and a surrounding outer filter volume connected to the other of the milk inlet and the outlet, wherein the milk filter is configured to be flushed during use by the milk to be filtered, wherein the cleaning device is configured to clean the milk filter by passing cleaning fluid through the milk filter.

The milking of dairy animals requires that the milk produced is filtered. Thereby, both dirt and particles of dung and bedding, hairs but also clumps or flakes of cells and such like are filtered out of the milk before it reaches the milk tank. After a time, the filter becomes too contaminated. Until now, filter cartridges have been used which must be replaced at least three times a day.

Dutch patent application number 2026406, not previously published, discloses a milking device of the above-described type which can be automatically cleaned by a cleaning device. Thus the filter is again suitable for further use without needing to be replaced. In this way, the labor-intensive exchange of the filter cartridges and the excessive use of raw materials is suitably prevented.

However, it appears in practice that such milking devices cannot always be optimally cleaned, in particular a top part of the milk filter, whereby the milk quality may diminish and whereby the milk filter becomes clogged earlier, which can lead to a standstill of the milking device. This is an undesirable situation which can largely outweigh the advantages.

It is thus an object of the present invention to improve the cleanability of the known milking device.

Thereto, the invention provides a milking device according to claim 1, and in particular a milking device for milking a dairy animal, and provided with milking means, a controller for the milking device, a milk line for transporting the milk from the milking means to a milk tank, a milk filter for filtering the milk passing through the milk line, and a cleaning device for cleaning the milk filter with cleaning fluid, wherein the milk filter comprises a housing surrounding a filter volume and comprising a milk inlet part with a milk inlet, a milk outlet part with a milk outlet, and a circumferential outer wall in between, a circumferential filter body provided in the filter volume comprising a plurality of filter holes, which divides the filter volume into a central inner filter volume connected to one of the milk inlet and the milk outlet, and a surrounding outer filter volume connected to the other of the milk inlet and the milk outlet, wherein the milk filter is configured to be flushed during use by the milk to be filtered, wherein the cleaning device is configured to clean the milk filter by passing cleaning fluid through the milk filter, wherein the plurality of filter holes comprises, during use of the milk filter, a top first group of filter holes and a second group of filter holes with a mean minimum diameter $D_g$ located below, wherein a subgroup of the holes of said first group has a larger minimum diameter than $D_g$.

In practice, in particular the top part of the milk filter (in use) is often difficult to clean, as was already known from said application number NL 2026404. By creating holes with a larger diameter at the top, it is possible for the resulting flow of cleaning liquid or fluid (if for example air is supplied) to have an improved cleaning effect. The larger diameter relative to the lower holes reduces the resistance and the speed to be obtained locally is higher. Thus the cleaning fluid may exert a greater mechanical effect. In addition, in practice often an air bubble occurs at the supply side of the filter body, which is then located at the top, and which hinders good cleaning. Without the applicant being bound to a declaration, it is assumed that the diameter of the holes in combination with the cleaning fluid flowing away on the other side, traps the air present, i.e. prevents it from escaping. Presumably, the surface tension of the water is high enough to trap air against the holes, which are too small to exert a filtering effect. According to the invention, the larger holes allow a more easily escape of air. Thus, the possibility is provided both to better discharge disturbing air and to allow the cleaning fluid to work more effectively.

Also, in practice, limits are imposed on the diameters of the holes depending on the circumstances. It is however important that the invention offers the possibility of providing holes with a larger diameter at the top and below the holes with a smaller diameter, and hence a difference in quality and function.

The term "during use of the milk filter, a top group of filter holes" means that during use of the filter, the holes are situated at a higher level than the filter holes located underneath. In practice, this is also the point at which an air bubble may form, and where cleaning may be more difficult. In such cases, it is always clear what the "top group" is. Also, the "minimum diameter" has the following meaning. Even round holes need not have the same diameter over the entire length, but may taper inwards or outwards. Because the filter action is effectively determined by the minimum diameter, this is considered as the dimension which defines the hole. If a hole has a non-round cross-section, even with a constant cross-section, there are different diameters. Here, too, the minimum diameter is the diameter which defines the dimension of the hole.

Particular embodiments of the invention are described in the dependent claims and are explained in more detail below.

According to the invention, the advantageous technical effect is achieved by providing holes, or filter holes, at the top of the milk filter which are larger than the holes used for filtering the milk. The latter, for reasons of filter suitability, are often very small, as will be discussed in more detail below. It is not excluded that in the two bottom groups of holes one or more holes are present which have a larger diameter than the average for the second group. It is also not excluded that more groups of holes are present in the filter body. Nonetheless, it may be clear that the plurality of holes in particular comprises of the first and the second group. Also, in some embodiments, the second group exclusively comprises holes with a diameter of substantially $D_g$. Here, the second group thus only comprises one type of hole, being holes with exclusively a milking filtration function. Their diameter is then evidently substantially equal to $D_g$, wherein "substantially" includes that dimensional tolerances in production of the holes and a single hole with a different function may be disregarded for determining the mean dimension $D_g$.

In some embodiments, the subgroup is substantially equal to the first group. Here, again, the subgroup may generally comprise both larger holes and other holes, such as one or more holes which correspond to the holes of the second group. In other words, in the first group, larger holes, i.e. from the subgroup, may alternate with smaller holes. Nonetheless, it is advantageous if the first group consists only of one type of hole, thus the larger holes. Then, the cleaning fluid flow need not be locally divided over holes of smaller diameter which do not give the desired extra powerful cleaning effect, but do consume part of the flow of cleaning fluid.

The number of holes in the first group or subgroup is not particularly restricted. Nonetheless, it is advantageous if the first group comprises at least three holes which are distributed over the circumference of the filter body. "Distributed over the circumference" here means "regularly or irregularly distributed over the circumference (of the filter body)". Thus the cleaning fluid may be distributed well over the circumference and any air bubbles can be reliably discharged via one or more of the three holes. Simply by removing the dirt, it may occur that an air bubble extends not around the filter body but locally delimited over only a part of the circumference of the filter body. With a single large hole, there is a chance that the air bubble may not reach the hole. Also the flow of cleaning fluid is then physically restricted. With three or more larger holes, there is already an improved air bubble discharge and cleaning fluid flow. More larger holes may in many cases lead to an even more reliable discharge or better flow.

The larger holes of the first group may generally be provided in an arbitrary arrangement, advantageously as long as they are distributed around the circumference. Advantageously however, these holes are regularly distributed so that a more reliable effect is obtained. Also, it is advantageous for production if the first group comprises a number N of rings, each of at least three holes distributed over the circumference of the filter body, wherein $1 \leq N \leq 10$, in particular $1 \leq N \leq 3$. By arranging the holes in rings, it may be possible, for example, to use a device for creating the holes such as a laser or similar, wherein the filter body is rotated and wherein the filter body or said device need only be adjusted in height after completing a ring. Also, other methods are possible for producing the holes, such as first in a plate which is then formed into the filter body with circumferential wall. The advantages of a ring in the definitive filter body, as a row in an originally flat plate, apply largely unchanged. It is possible to create a single ring of larger holes, and also a number of rings, wherein the holes of neighboring rings need not necessarily be placed below one another.

In some embodiments, the plurality of holes is provided over a part of the filter body with a height h, and the first group is provided in said part over a height of maximum $A \times h$, wherein $0 < A \leq 0.1$. Here, the larger holes are thus provided in the top $A \times 100\%$ of the total hole group. There is freedom for distributing the larger holes arbitrarily in that part of the total plurality of holes provided. For a single ring, A is hence minimal and largely 0, but it is also possible to create the larger holes in a slightly higher area such as up to 10% of the height. This offers the possibility of cleaning a slightly higher part of the filter body more powerfully, without the force diminishing too greatly due to the part being too large.

Generally, the milk filter can be cleaned with the main cleaning, wherein hot water, where applicable with a cleaning agent such as a lye or acid, is conducted through the milk filter in the same direction as the milk to be filtered. However, it offers advantages if, in addition, the milk filter is configured to be flushed during use by the milk to be filtered in a first direction, which first direction runs from the milk inlet to the milk outlet, and the cleaning device is configured to clean the milk filter by conducting cleaning fluid through the milk filter in a counter-flow direction opposite the first direction. With such a counter-flow cleaning, contaminants, such as sand particles, which cannot be removed or fully removed by the cleaning fluid, can still be reliably removed from the milk filter. For details of this measure, reference is made to said Dutch application number 2026404.

The holes of the second group should filter the milk well, wherein a smaller diameter guarantees a more stringent filtration, but wherein the composition of the milk must also be taken into account, since this includes amongst others fat globules which must of course not be captured. Therefore advantageously $D_g \leq 0.10$ mm, in particular $D_g \leq 0.08$ mm, more particularly $0.06 \leq D_g \leq 0.08$ mm. With respect to these holes of the second group, according to the invention the holes of the subgroup in the first group of holes have a larger minimum diameter. Advantageously, the holes of said subgroup have a minimum diameter of $>0.10$ mm, in particular between 0.15 mm and 0.25 mm. With such dimensions, there is sufficient guarantee of discharging any air bubbles and providing a good extra cleaning force at the site of the larger holes, without an unnecessarily high risk of too many contaminants slipping through the larger holes.

Advantageously, the top and/or in particular the bottom holes are tapered. For example, they are produced by means of a laser. Thus substantially conical holes are formed. It may be useful to direct the holes with their smallest diameter towards the dirty side, i.e. towards the inflow side of the milk, and hence with their largest diameter towards the outflow side. Thus impurities in the milk to be filtered are retained by the filter body without getting stuck in the tapering holes. When cleaning fluid is then passed in counter-flow through the filter body, it may be able to remove in a better way the impurities still present in the holes, which become narrower in the counter-flow direction, because with the narrower holes the flow speed and in some cases the turbulence intensity May increase. In practice, the dimensions of the holes are largely determined by the properties of the milk. This is explained in more detail in the above-mentioned Dutch application number 2025404.

In some embodiments, said filter body comprises a cylindrical plate part. In attractive embodiments, the housing is substantially cylindrical and said filter body is a metal plate which is concentric with the outer wall. In itself, the shape of the housing and the filter body is not particularly limited, but advantageously these are concentric so as to guarantee good control of the flow of the cleaning fluid through the housing and along and through the filter body. In addition, a cylindrical form of the filter body contributes to the cleaning ability of the assembly, because corners are thus avoided which are difficult to clean with a much lower flow and fewer speed fluctuations.

In alternative embodiments, said filter body comprises wire with a unilateral tapering cross-sectional profile, and a frame, which wire is provided in a spiral shape with several windings or in a row of parallel separate rings or bars, wherein the frame is configured to keep the windings or rings or bars at a mutual distance, such that between the windings or rings or bars, a plurality of filter openings is provided which form the plurality of filter holes. An advantage of such a filter form is that this can be suitably produced with well manageable tolerances. Purely because of the many elongated filter holes, rather referred to as filter openings or channels, there is a risk that likewise elongated dirt particles, with a longest dimension which is much larger than the smallest dimension of the filter openings, may pass through the lower filter part. For example, a hair of a dairy animal with a diameter of around 0.08 mm and a length of for example a few centimeters can reasonably pass easily through a filter opening, of which the smallest diameter is only marginally larger, such as 0.1 mm, but which is elongated, in particular if the frame is attached on the side of the largest distance between the windings, rings or bars. After all, the length of the filter holes on the inflow side is very large. It is favorable if the smallest dimension of the filter holes, which in almost all practical cases corresponds to the distance between the windings, rings or bars, is clearly smaller than the smallest elongate dirt particles to be expected. In the case of a milk filter, these are the hairs, so that the smallest dimension is preferably at maximum 80 μm. Theoretically, it is possible to use a frame with very many support wires or support rings, and thereby create square holes or even filter holes in which the smallest dimension extends between said support wires or rings. This however requires a great deal of work to produce the connections between the frame and wire, and takes up so much of the through-flow surface area of the filter part that this may be no more than theoretical. Note that this problem occurs much less or even not at all in the case of a plate with holes, because in practice, those holes will be mostly round.

For more details concerning this embodiment, reference is made to Dutch applications numbers 2028863, 2028864 and 2028865, not previously published.

The invention also provides a milk filter for use in a milking device according to the invention, comprising a housing surrounding a filter volume and comprising a milk inlet part with a milk inlet, a milk outlet part with a milk outlet, and a circumferential outer wall in between, a circumferential filter body provided in the filter volume and comprising a plurality of filter holes, which filter body divides the filter volume into a central inner filter volume and a surrounding outer filter volume, wherein during use the milk filter is configured to be flushed in a first direction by the milk to be filtered, which first direction runs from the milk inlet to the milk outlet, wherein during use of the milk filter the plurality of filter holes comprises a top first group of filter holes and a second group of filter holes with a mean minimum diameter $D_g$ located below, wherein a subgroup of the holes of said first group has a larger minimum diameter than $D_g$.

When used in a milking device according to the invention, this milk filter provides the possibility of providing the same advantages with respect to cleaning ability. For the sake of brevity, for further details reference is made to the corresponding parts of the description of the milking device. It is expressly pointed out that all features cited for the milking device apply without restriction to the milking filter itself according to the invention unless specified otherwise.

The invention also provides a filter body for use in a milking device or in a milk filter according to the invention, comprising a circumferential filter body with a plurality of filter holes which comprise, during use of the milk filter, a top first group of filter holes and a second group of filter holes with a mean minimum diameter $D_g$ located below, wherein a subgroup of the holes of said first group has a larger minimum diameter than $D_g$. Here too, the filter body also provides the possibility, when used in the milking device or milk filter according to the present invention, of providing the above-mentioned advantages, which again need not necessarily be repeated. It goes without saying that it is not immediately necessary to see from the filter body which are the upper holes and which are the lower holes. In the case where the filter body can be placed on the milking filter in two positions, nonetheless it may be evident that one end has holes with a larger diameter and at the other end are the "bottom" holes with smaller diameter. Usually however, on such a filter body, an indication is given of in which position the milking filter may be mounted.

Figure 2:
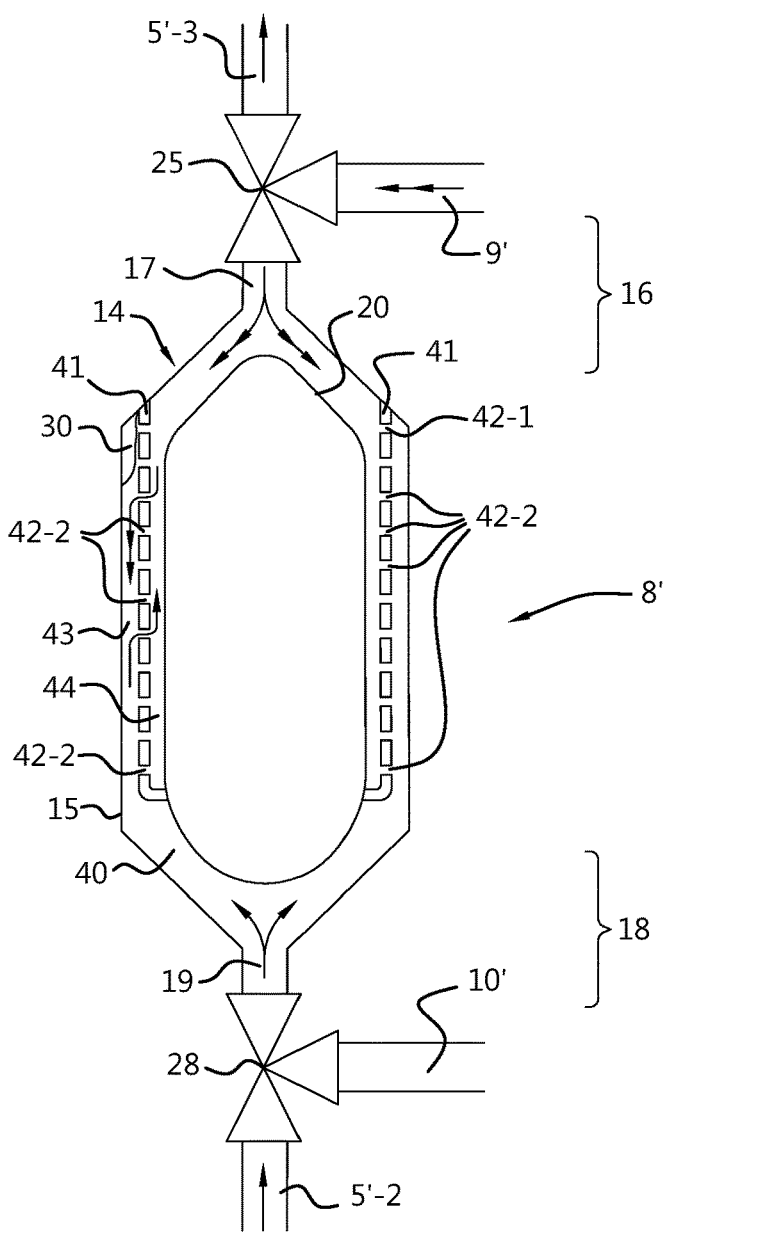

The invention will be explained in more detail below with reference to some non-restrictive exemplary embodiments and the drawing and its description, in which:

FIG. 1 shows a schematic view of a milking device according to the invention, FIG. 2 shows a schematic cross-sectional view of a detail of the milking device with a milk filter 8', FIGS. 3A and 3B show two embodiments of a filter body according to the invention, in a schematic perspective view, and FIG. 4 shows a filter body of an alternative milk filter according to the invention.

FIG. 1 shows a schematic view of a milking device 1 according to the invention, with a teat cup 2, milk glass 3, a vacuum pump 4, a milk line 5-1, 5-2, 5-3, a milk pump 6, a milk tank 7 and a milk filter which is generally indicated with reference number 8, with a schematic cleaning fluid connection 9 and a schematic discharge connection 10. 11 designates a controller, and 12 an optional milking robot with a robot arm 13. 100 indicates a dairy animal with teats 101.

Here, the milking device 1 is a fully automatic milking robot system but the invention is equally applicable in conventional milking systems without a milking robot, wherein a human attaches the teat cups. The milking robot 12 of this milking device 1 may, with its robot arm 13, attach milking means, here a teat cup 2, to a teat 101 of the dairy animal under the control of the controller 11. For this, components known in themselves are provided, such as a teat identification system, having no relation to the invention and are therefore neither shown nor explained in more detail here.

With the teat cup attached to the teat 101 the milking device can extract milk, amongst others by means of the vacuum pump 4, which milk then reaches the milk glass 3. From there, in particular at the end of a milking, the milk is transported via the milk pump 6 and the milk line with parts 5-1, 5-2 and 5-3, here jointly indicated with the reference sign 5, to the milk tank 7. In very large facilities, the fixed milk tank 7 may also be replaced by the tank of a tanker vehicle.

The extracted milk is filtered by means of the milk filter 8 provided in the milk line 5. This filter serves to remove irregularities such as hairs, sand, bedding material and the like, but also to filter flakes and other animal-specific materials from the milk. In the example shown, the milk passes from bottom to top through the milk filter. Inevitably, the milk filter will gradually become dirtier and must therefore be regularly cleaned. This takes place for example with each main cleaning of the entire milking device. Also a pressure drop gauge or similar (not shown here) may be provided which measures the pressure drop over the milk filter 8, and if the pressure drop exceeds a threshold value, sends a signal to the controller 11 to carry out an intermediate cleaning of the milk filter 8.

The cleaning may take place for example by conducting cleaning fluid through the filter in the same direction as the milk, i.e. from the teat cups 2 via the milk line 5 through the milk filter 8 to the milk tank 7. The hot, acidic or alkaline fluids to be used may for example suitably dissolve fat, protein or calcium residue. It is less favorable that hairs, sand and similar are pressed further against the filter without being removed or dissolved. For this however, a back-flush cleaning may be carried out, wherein cleaning fluid is supplied in the reverse direction, in particular from the cleaning fluid supply 9 via the milk filter 8 to the cleaning fluid discharge 10, such as a drain.

FIG. 2 shows a schematic cross-sectional view of a detail of the milking device with a milk filter 8'. Similar parts are indicated with the same reference sign, in some cases with an apostrophe.

A housing 14 has an outer wall 15 which surrounds a filter volume 40, and a milk inlet part 16 with a milk inlet 17, and a milk outlet part 18 with a milk outlet 19. A core 20 is situated in a filter interior 40 which is divided by a plate part 41, having top holes 42-1 and bottom holes 42-2, into an outer filter volume 43 and an inner filter volume 44. The path of the milk is indicated with single arrows and the path of the cleaning fluid with double arrows.

25 indicates a first three-way valve and 28 a second three-way valve. 30 indicates an air bubble.

The milk is filtered here by conducting the milk through the circumferential cylindrical plate part 41. The plate part 41 is provided with holes 42 which allow the greatest part of the milk and its constituents such as fat globules to pass through, but stop irregularities such as hairs, sand grains, straws, but also cell clumps from mastitis cows etc. The holes 42 are advantageously less than 0.10 mm in diameter, such as around 0.08 mm or around 0.06 mm.

Such milk filters must of course be cleaned. This may take place in various ways such as with a main cleaning with acid or alkaline means, and with hot water, provided for example via the teat cups from a main cleaning fluid supply (not shown here). Also a back-flush may be used for cleaning, wherein cleaning fluid is supplied via a cleaning fluid supply 9' and conducted through the milk filter 8' in the reverse direction. In this case, the milk line part 5'-3 and the cleaning fluid supply 9' are connected via the first three-way valve 25. The milk line part 5'-2 and the cleaning fluid discharge 10' are connected via a second three-way valve 28. The cleaning fluid may carry dirt and be discharged via the discharge 10'.

In practice, a varying amount of the dirt may settle on a milk surface in the filter. This part may mainly settle in the top of the filter. It will therefore be desirable to clean the top part of the filter in particular, such as the part of the plate part 41 with the holes there, more thoroughly than the lower part. Also, during the supply of cleaning fluid, sometimes an air bubble 30 may occur in the outer filter volume 43 if the top holes 42-1 and bottom holes 42-2 are the same size. It is assumed that the (small) holes in combination with the inflowing cleaning fluid form a barrier for any air present, so that it cannot escape. This air bubble 30 may prevent the cleaning fluid from cleaning the top (outermost) part of the milk filter 8', both from the plate part 41 and from the inside of the outer wall 15.

For example, this is suitably resolved by dividing the holes 42 into top holes 42-1 and below bottom holes 42-2, wherein the top holes 42-1 have a larger minimum diameter than the bottom holes 42-2. Not only can cleaning fluid then flow through the top holes 42-1 with a greater speed and hence with more (mechanical) cleaning power, but also air from the air bubble 30 can escape through the larger holes and flow away upward. The top holes 42-1 have for example a diameter which is larger than 0.10 mm, such as 0.15 or 0.20 mm. Too large is undesirable because too many large dirt particles can then pass through the filter.

The top holes 42-1 are here shown as a single ring of holes evenly distributed over the plate part 41. It is also possible to provide several rings, such as over a total width of e.g. 5% of the height of the filter part, viewed from the topmost hole of the plate part. All this is related to the total height of the plate part 41 and possibly to preferences with respect to filter capacity. However, it is possible that extra dirt may slip through the filter 8' via the top holes 42-1. If the number of top holes 42-1 relative to the number of bottom holes remains limited, this effect is considerably limited.

FIGS. 3A and 3B show two embodiments of a filter body according to the invention in a schematic, perspective view.

FIG. 3A shows a first filter body 45 with a circumferential plate part 41', with a first group of large holes 42'-1 with a diameter d1 within a height A×h between the dotted lines, and a second group of small holes 42'-2 with a diameter d2 over a height (1-A)×h.

The filter body 45 shown here comprises a filter plate 41' with a top first group of holes 42'-1 and below this a second group of holes 42'-2. The bottom holes 42'-2 have a diameter d2 suitable for efficiently filtering milk, in particular less than 0.10 mm, such as around 0.08 mm or 0.06 mm. Depending on the type of milk to be filtered, or the type of bedding material, a different choice of diameter d2 is possible. Generally all holes 42'-2 are the same so that the mean diameter $D_g$ is equal to d2.

The top holes 42'-1 are here provided in two rings within a top region of the holes in the plate part 41', which region is indicated with dotted lines. The region here has a height A×h, wherein h is the total height over which the holes 42'-1 and 42'-2 are provided. For example, h=15 or 20 cm, and for example A=0.1 or 0.02, wherein other values are quite possible. If more rings are provided, A may be larger, and if only one ring is provided, A may be almost zero. In the case shown, around 12 holes 42'-1 are provided. A different number of holes 42'-1 is however also possible, wherein these are still distributed over the circumference of the plate part 41' or generally over the filter body 45. The number may then be minimum 3. These holes 42'-1 may be distributed over different rings. It is also possible to provide the holes 42'-1 with irregular distribution.

The diameter d1 of the holes 42'-1 is greater than the mean diameter $D_g$ of the bottom holes 42'-2, and therefore also greater than the diameter d2 of each of the holes 42'-2. The diameter d1 is selected so that cleaning fluid can flow faster locally and more powerfully, and to allow any air bubbles to pass through (easier). A favorable diameter is for example around 0.15 mm or 0.20 mm, wherein other values are not excluded. It is not excluded that a single hole 42'-2 for some reason has a greater diameter, as long as the condition is fulfilled that some of the top holes 42'-1 still have a larger diameter than the mean $D_g$. Also, as in the entire application, the "diameter" generally means "minimum diameter" unless explicitly specified otherwise.

FIG. 3B shows another embodiment of a filter body 45' according to the invention, again with a filter plate with first holes 42"-1 and second holes 42"-2. The first top filter holes 42"-1 are provided as a ring of holes but now alternating with second holes 42"-2. Below the ring, only second holes 42"-2 are provided. The diameter of the largest first holes 42"-1 is d1, and that of the second holes 42"-2 is d2.

In this case, the ring of first holes 42"-1 together with the second holes 42"-2 provided between the individual first holes in the ring is considered the top group of holes. The holes below, here exclusively second holes, are considered the second group of holes. A subgroup of the first group, in particular the large first holes 42"-1, are holes with a diameter, here d1, which is greater than the mean diameter $D_g$ of the holes of the second group, here d2. Thus the condition according to the invention is fulfilled.

For the dimensions d1, d2 and the numbers of first and second holes 42"-1 and 42"-2, the same considerations apply generally as for the description of FIG. 3A. Also, the first holes 42"-1 may be provided in several rings, in irregular shapes etc.

FIG. 4 shows a filter body with an alternative milk filter according to the invention.

The filter body 45" comprises bars 50 and a spiral wire 51 between which top holes 42'-1 and bottom holes 42'-2 are provided. The dimensions are indicated with d1, d2 and d3.

The filter body 45" fulfils the same function as the cylindrical plate part 41 in FIGS. 2 and 3A/B. However, here the filter body 45" is not formed from a plate with holes but by winding a wire 51 in a spiral shape around a frame of bars 50. Between the bars 50 and the wire 51, channels or holes are produced. By winding the wire with a greater pitch or intermediate distance d2 at the top than at the bottom, with a pitch d1, the top holes 42'-1 are larger than the bottom holes 42'-2. Note that all holes 42' are elongated here, and that the "cross-section" here is taken to be the smallest cross-section, i.e. its height.

Advantageously, the wire 51 has a triangular cross-section, wherein the narrowest part is attached to the bars 50. Thus the holes 42 are tapered, in this case from the inside out. This offers advantages when the milk flows from the outside in through the filter body 45", such as in the milk filter of FIGS. 1 and 2. Particles which can be filtered do not get stuck in the channels or holes 42', and the dirt filtered out can easily be released from the filter body 45" on back-flushing, in particular because the cleaning fluid accelerates towards the outside through the tapering channels. This advantage can also be achieved for example with the cylindrical plate part of FIG. 2 if tapering holes are provided therein, such as by means of a laser. It is also possible to construct the filter body 45" from for example rings instead of a single continuous wire 51. For details on this, reference is made to applications NL 2026404 and NL 2028863, not previously published.

The exemplary embodiments shown are in no way intended to be restrictive. Rather, the scope of protection of the invention is determined by the appended claims.

The invention claimed is:

1. A milking device for milking a dairy animal, the milking device comprising:
    a milking means;
    a controller for the milking device;
    a milk line for transporting milk from the milking means to a milk tank;
    a milk filter for filtering the milk passing through the milk line, the milk filter comprising
        a housing surrounding a filter volume, the housing comprising
            a milk inlet part having a milk inlet,
            a milk outlet part having a milk outlet, and a circumferential outer wall disposed between the milk inlet part and the milk outlet part,
        a single circumferential filter body disposed within the filter volume, the single circumferential filter body being comprised of a plurality of filter holes, the plurality of filter holes dividing the filter volume in a central inner filter volume connected to the milk inlet or the milk outlet, and a surrounding outer filter volume connected to the milk inlet or the milk outlet; and
        a cleaning device for cleaning the milk filter with cleaning fluid,
    wherein the milk filter is configured to be flushed during use by the milk to be filtered,
    wherein the cleaning device is configured to clean the milk filter by passing cleaning fluid through the milk filter,
    wherein, during use of the milk filter, the plurality of filter holes comprises a first group of filter holes, and a second group of filter holes located below the first group of filter holes, the second group of filter holes having a mean minimum diameter $D_g$, and
    wherein a subgroup of the first group of filter holes has a larger minimum diameter than $D_g$.

2. The milking device according to claim 1, wherein the second group of filter holes further comprises only filter holes with a diameter of substantially $D_g$.

3. The milking device of claim 1, wherein the subgroup of the first group of filter holes has a diameter substantially equal to the diameter of the filter holes of the first group of filter holes.

4. The milking device of claim 1, wherein the first group of filter holes further comprises at least three filter holes which are distributed circumferentially over the filter body.

5. The milking device of claim 1, wherein the first group of filter holes further comprises a plurality of rings of filter holes distributed circumferentially over the filter body, the plurality of rings of filter holes being comprised of no more than 10 rings of filter holes.

6. The milking device of claim 5, wherein the plurality of rings of filter holes is comprised of no more than 3 rings of filter holes.

7. The milking device of claim 1, wherein the plurality of filter holes are disposed over a first part of the filter body having a height h, and wherein the first group of filter holes is disposed within the first part of the filter body, and over a maximum height of A×h of the first part of the filter body, wherein 0<A≤0.1.

8. The milking device of claim 1, wherein during use the milk filter is configured to be flushed by the milk to be filtered in a first direction, the first direction running from the milk inlet to the milk outlet, and wherein the cleaning device is configured to clean the milk filter by conducting cleaning fluid through the milk filter in a counter-flow direction, the counter-flow direction being opposite the first direction.

9. The milking device of claim 1, wherein the subgroup of the first group of filter holes has a minimum diameter greater than 0.10 millimeters.

10. The milking device of claim 9, wherein the subgroup of the first group of filter holes have a minimum diameter less than 0.15 millimeters and greater than 0.25 millimeters.

11. The milking device of claim 1, wherein $D_g$ is less than 0.10 mm.

12. The milking device of claim 11, wherein $D_g$ is less than 0.08 millimeters.

13. The milking device of claim 12, wherein $D_g$ is greater than 0.06 millimeters.

14. The milking device of claim 1, wherein the filter body further comprises a cylindrical plate part.

15. The milking device of claim 1, wherein the filter body further comprises a wire with a unilateral tapering cross-sectional profile, and a frame, the wire having a spiral shape with several windings or the wire being disposed in a series of separate parallel rings or bars, wherein the frame is configured to keep the windings or rings or bars at a mutual distance, and wherein between the windings or rings or bars, a plurality of filter openings is disposed, the plurality of filter openings forming the plurality of filter holes.

16. The milking device of claim 1, wherein, during the use of the milk filter, one part of the milk passes only through the subgroup of the first group of filter holes having a larger minimum diameter than $D_g$, and does not pass through the second group of filter holes having a mean minimum diameter $D_g$.

17. The milking device of claim 1, wherein, during the use of the milk filter, one part of the milk passes only through the subgroup of the first group of filter holes having a larger minimum diameter than $D_g$, and another part of the milk passes through the second group of filter holes having a mean minimum diameter $D_g$ at a same moment in time.

18. A milk filter for use in a milking device, the milk filter comprising:

a housing surrounding a filter volume, the housing comprising
  a milk inlet part having a milk inlet,
  a milk outlet part having a milk outlet, and
  a circumferential outer wall disposed between the milk inlet part and the milk outlet part; and
a single circumferential filter body disposed within the filter volume, the single circumferential filter body being comprised of a plurality of filter holes, the plurality of filter holes dividing the filter volume into a central inner filter volume and a surrounding outer filter volume,
wherein the milk filter is configured to be flushed during use by the milk to be filtered in a first direction, the first direction running from the milk inlet to the milk outlet,
wherein, during use of the milk filter, the plurality of filter holes comprises a first group of filter holes, and a second group of filter holes located below the first group of filter holes, the second group of filter holes having a mean minimum diameter $D_g$, and
wherein a subgroup of the first group of filter holes has a larger minimum diameter than $D_g$.

* * * * *